US 9,405,695 B2

United States Patent
Chang et al.

(10) Patent No.: US 9,405,695 B2
(45) Date of Patent: Aug. 2, 2016

(54) CACHE MODELING USING RANDOM SAMPLING AND A TIMESTAMP HISTOGRAM

(71) Applicant: NETAPP, INC., Sunnyvale, CA (US)

(72) Inventors: Koling Chang, Davis, CA (US); Ravikanth Dronamraju, Pleasanton, CA (US); Mark Smith, Sunnyvale, CA (US); Naresh Patel, San Jose, CA (US)

(73) Assignee: NETAPP, INC., Sunnyvale, CA (US)

( * ) Notice: Subject to any disclaimer, the term of this patent is extended or adjusted under 35 U.S.C. 154(b) by 90 days.

(21) Appl. No.: 14/072,639

(22) Filed: Nov. 5, 2013

(65) Prior Publication Data

US 2015/0127905 A1   May 7, 2015

(51) Int. Cl.
*G06F 12/08* (2016.01)
*G06F 11/34* (2006.01)

(52) U.S. Cl.
CPC ........ *G06F 12/0871* (2013.01); *G06F 11/3447* (2013.01); *G06F 11/3461* (2013.01); *G06F 2201/885* (2013.01); *G06F 2212/502* (2013.01); *G06F 2212/601* (2013.01)

(58) Field of Classification Search
None
See application file for complete search history.

(56) References Cited

U.S. PATENT DOCUMENTS

| | | | |
|---|---|---|---|
| 7,360,043 B1 * | 4/2008 | Bonebakker .......... | G06F 12/123 711/136 |
| 2008/0071987 A1 * | 3/2008 | Karn et al. .................... | 711/118 |
| 2009/0300293 A1 * | 12/2009 | Mantor et al. ................ | 711/141 |
| 2010/0281216 A1 * | 11/2010 | Patel et al. ..................... | 711/118 |
| 2013/0086337 A1 * | 4/2013 | Habeck ......................... | 711/156 |
| 2013/0138889 A1 * | 5/2013 | Chockler ............ | G06F 12/0866 711/129 |
| 2013/0166724 A1 * | 6/2013 | Bairavasundaram . | G06F 9/5016 709/224 |

* cited by examiner

*Primary Examiner* — Jared Rutz
*Assistant Examiner* — William E Baughman
(74) *Attorney, Agent, or Firm* — Haynes and Boone, LLP

(57) ABSTRACT

A system and method for determining an optimal cache size of a computing system is provided. In some embodiments, the method comprises selecting a portion of an address space of a memory structure of the computing system. A workload of data transactions is monitored to identify a transaction of the workload directed to the portion of the address space. An effect of the transaction on a cache of the computing system is determined, and, based on the determined effect of the transaction, an optimal cache size satisfying a performance target is determined. In one such embodiment the determining of the effect of the transaction on a cache of the computing system includes determining whether the effect would include a cache hit for a first cache size and determining whether the effect would include a cache hit for a second cache size different from the first cache size.

20 Claims, 10 Drawing Sheets

CACHE MODELING USING RANDOM SAMPLING AND A TIMESTAMP HISTOGRAM

TECHNICAL FIELD

The present description relates to cache modeling and, more specifically, to a system and method of monitoring data transactions in order to predict the impact of adding various size caches.

BACKGROUND

Hierarchically arranged memory has been a common feature in computing for some time. Fundamentally, faster memory is more expensive per byte. Despite rapid advances in storage performance, it is often economically unsound to utilize only the lowest latency storage medium. Instead, in order to deliver acceptable performance within a fixed budget, storage devices of different sizes and speeds may be arranged so that memory transactions read or write to the fastest devices whenever possible.

In a typical example, a hierarchical memory structure includes a main memory and one or more caches. The main memory is a large pool of storage, and, for reasons including cost, is often made up of relatively slow storage devices. The main memory defines the address space and thereby defines the limits of the available storage. However, portions of the address space may be mapped to a cache, a memory pool typically utilizing a faster storage medium, so that transactions directed to mapped addresses can be read from and/or written to the faster storage medium. In multiple-tiered configurations, portions of the cache may be mapped to another cache made up of a faster storage medium. In many examples, memory structures include multiple caches, each utilizing progressively faster storage media.

A number of techniques exist for determining which address ranges to map to a particular cache. For example, principles of locality are commonly used in cache mapping. The principle of temporal locality suggests that data that has been accessed recently is likely to be accessed again. Accordingly, frequently accessed data is often cached. The principle of spatial locality suggests that data accesses tend to cluster around certain address. Accordingly, a range of addresses is often cached based on an access to an address within the range. By effectively predicting data that will be the target of subsequent transactions, more transactions can be performed by the cache even when the cache medium is significantly smaller than the main memory. However, there is a minimum cache size beyond which performance is unacceptably impacted. Unfortunately, the minimum cache size depends, in large part, on the interrelationship of the memory transactions, and no one minimum size is correct for all applications.

Storage systems, computing systems that process data transactions on behalf of other computing systems, are generally very cache-sensitive. Storage systems typically receive a large number of transactions and can experience widely varying workloads depending on host activity. These effects and others make it extremely difficult to pre-judge proper cache sizes. Further complicating matters, due to the large number of transactions, the computing cost to determine a proper cache size by analyzing real-world workloads may prove prohibitive. Accordingly, an efficient system and method for modeling a cache and determining an optimal cache size based on observed data transactions has the potential to improve cache size matching and system performance.

BRIEF DESCRIPTION OF THE DRAWINGS

The present disclosure is best understood from the following detailed description when read with the accompanying figures.

DETAILED DESCRIPTION

Figure 1:
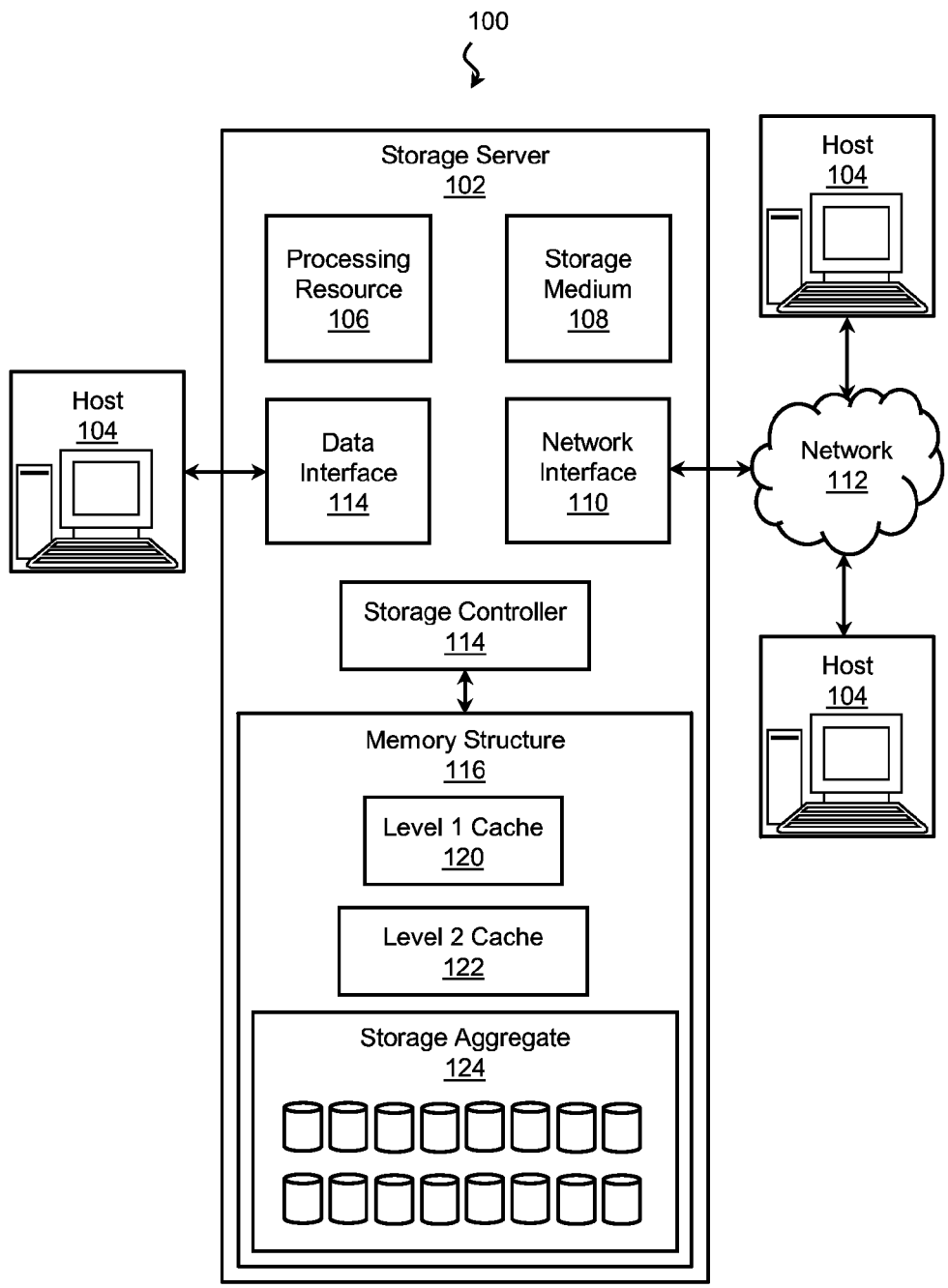
FIG. 1 is an organizational diagram of a data storage architecture according to aspects of the present disclosure.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments. Finally, in view of this disclosure, particular features described in relation to one aspect or embodiment may be applied to other disclosed aspects or embodiments of the disclosure, even though not specifically shown in the drawings or described in the text.

Various embodiments include systems, methods, and computer programs that model the performance of a hypothetical cache using real-world workloads. The hypothetical cache represents a cache to be added to a computing system. By modeling various cache sizes and comparing the respective benefits, a user can determine a cache size that balances system performance with cache cost. In one example, a computing system, such as a storage system, determines a representative subset of a memory space for analysis. Data transactions directed to the subset of the memory space are analyzed to determine their effects on the hypothetical cache. The computing system monitors and records the effects utilizing a number of status trackers such as a pseudo cache (pcache), a cache timestamp histogram, or a cumulative cache timestamp histogram. Using the status trackers, the computing system determines one or more performance metrics associated with various sized hypothetical caches. For example, the computing system may determine hit ratios for various cache sizes. A user can compare the performance metrics associated with hypothetical caches of various sizes to find a minimum cache size that meets a performance target. By modeling cache performance using real-world workloads, the embodiments of the present disclosure overcome the difficulties and inaccuracies inherent in synthetic cache modeling. Furthermore, in applications where modeling the full memory space would hinder other computing tasks, the cache performance may be determined by modeling a representative portion of the memory space and extrapolating the results. This lessens the processing burden associated with real-world modeling. In this way, the various embodiments provide an efficient and accurate model of cache performance using actual workloads.

FIG. 1 is an organizational diagram of a data storage architecture 100 according to aspects of the present disclosure. The data storage architecture 100 includes a storage server 102 that processes data transactions on behalf of other computing systems including one or more hosts 104. The storage server 102 receives data transactions (e.g., requests to read and/or write data) from the hosts 104, and takes an action such as reading, writing, or otherwise accessing the requested data. For many exemplary transactions, the storage server 102 provides a response such as requested data and/or a status indictor to the respective host 104. The storage server 102 is merely one example of a computing system that may be used in conjunction with the systems and methods of the present disclosure.

The storage server 102 is a computing system and, in that regard, may include a processing resource 106 (e.g., a microprocessor, a microprocessor core, a microcontroller, an application-specific integrated circuit (ASIC), etc.), a non-transitory computer-readable storage medium 108 (e.g., a hard drive, flash memory, random access memory (RAM), optical storage such as a CD-ROM, DVD, or Blu-Ray device, etc.), a network interface device 110 (e.g., an Ethernet controller, wireless communication controller, etc.) operable to communicate with one or more hosts 104 over a network 112, and a data interface 114 operable to communicate with one or more hosts 104 without necessarily using a network.

The storage server 102 includes a storage controller 114 in communication with a hierarchical memory structure 116. The memory structure 116 may include any number of tiers and, in an exemplary embodiment, includes a level 1 cache 120 at the first (highest) tier, a level 2 cache 122 at a lower tier, and a storage aggregate 124 at the lowest tier. The storage aggregate 124 and the caches 120 and 122 are made up of any suitable storage devices using any suitable storage media including electromagnetic hard disk drives (HDDs), solid-state drives (SSDs), flash memory, RAM, optical media, and/or other suitable storage media. Each tier may include devices of single type (e.g., HDDs) or may include a heterogeneous combination of mediums (e.g., HDDs with built-in RAM caches).

Typically, faster devices are used in higher tiers of the memory structure 116. In the illustrated embodiment, the level 1 cache 120 is higher in the hierarchy than the level 2 cache 122, which is higher in the hierarchy that the storage aggregate 124. Accordingly, in one embodiment, the storage aggregate 124 includes a plurality of HDDs arranged in a Redundant Array of Independent Disks (RAID) configuration, the level 2 cache 122 includes a plurality of solid state drives (SSDs) and the level 1 cache 120 includes a RAM cache. This is a common configuration for a storage server 102 in part because of the increased performance of SSDs with respect to HDDs. In a further embodiment, the storage aggregate 124 includes Serial ATA (SATA) HDDs, the level 2 cache 122 includes Serial Attached SCSI (SAS) HDDs, and the level 1 cache 120 includes SSDs. SATA HDDs are often more cost-effective than SAS HDDs, but may have longer latency and reduced data transfer rates. These configurations are merely exemplary, and the storage aggregate 124 and the caches 120 and 122 may each include any suitable storage device or devices in keeping with the scope and spirit of the present disclosure.

The storage server 102 receives memory transactions from the hosts 104 directed to the data of the memory structure 116. During operation, the storage server 102 may also generate memory transactions independent of those received from the hosts 104. Memory transactions are requests to read, write, or otherwise access data stored within a computer memory such as the memory structure 116, and are often categorized as either block-level or file-level. Block-level protocols designate data locations using an address within the memory structure 116. Exemplary block-level protocols include iSCSI, Fibre Channel, and Fibre Channel over Ethernet (FCoE). iSCSI is particularly well suited for embodiments where data transactions are received over a network 112 that includes the Internet, a Wide Area Network (WAN), and/or a Local Area Network (LAN). Fibre Channel and FCoE are well suited for hosts 104 that are coupled to the storage server 102 via a direct connection such as that provided by the data interface 114. A Storage Attached Network (SAN) device is a type of storage server 102 that responds to block-level transactions.

In contrast to block-level protocols, file-level protocols specify data locations by a file name. A file name is an identifier within a file system that can be used to uniquely identify corresponding memory addresses. File-level protocols rely on the storage server 102 to translate the file name into respective memory addresses. Exemplary file-level protocols include SMB/CFIS, SAMBA, and NFS. A Network Attached Storage (NAS) device is a type of storage server 102 that responds to file-level transactions. It is understood that the scope of present disclosure is not limited to either block-level or file-level protocols, and in many embodiments, the storage server 102 is responsive to a number of different memory transaction protocols.

When a memory transaction is received by the storage server 102 or generated by the storage server 102, the storage server 102 may determine the highest tier of the hierarchy that can be used to service the transaction. As higher tiers of the hierarchy typically include faster storage media, servicing a transaction at a higher tier often reduces transaction latency and improves data throughput. In an exemplary embodiment, the storage controller 114 first checks a target memory address of the transaction against the address space of the level 1 cache 120. If the target memory address falls within the address space of the level 1 cache 120 (i.e., the address "hits" the level 1 cache 120), the storage controller 114 services the request using the level 1 cache 120. If the target memory address is not within the address space of the level 1 cache 120 (i.e., the address "misses" the level 1 cache 120), the storage controller 114 checks the target memory address against the address space of the level 2 cache 122. If the address misses the level 2 cache 122, the storage controller 114 services the request using the final tier, the storage aggregate 124. It can be seen that, in general, the larger the address space of a cache, the more requests can be serviced by the cache. Beyond a certain cache size, however, diminishing returns are observed, and a large cache may not always justify the cost. For this reason and others, the present disclosure presents various embodiments of a system and method for determining the number of requests serviced and other metrics associated with a given cache size. From these performance metrics, a user can determine the smallest and most affordable cache that still meets a performance target.

Figure 2A:
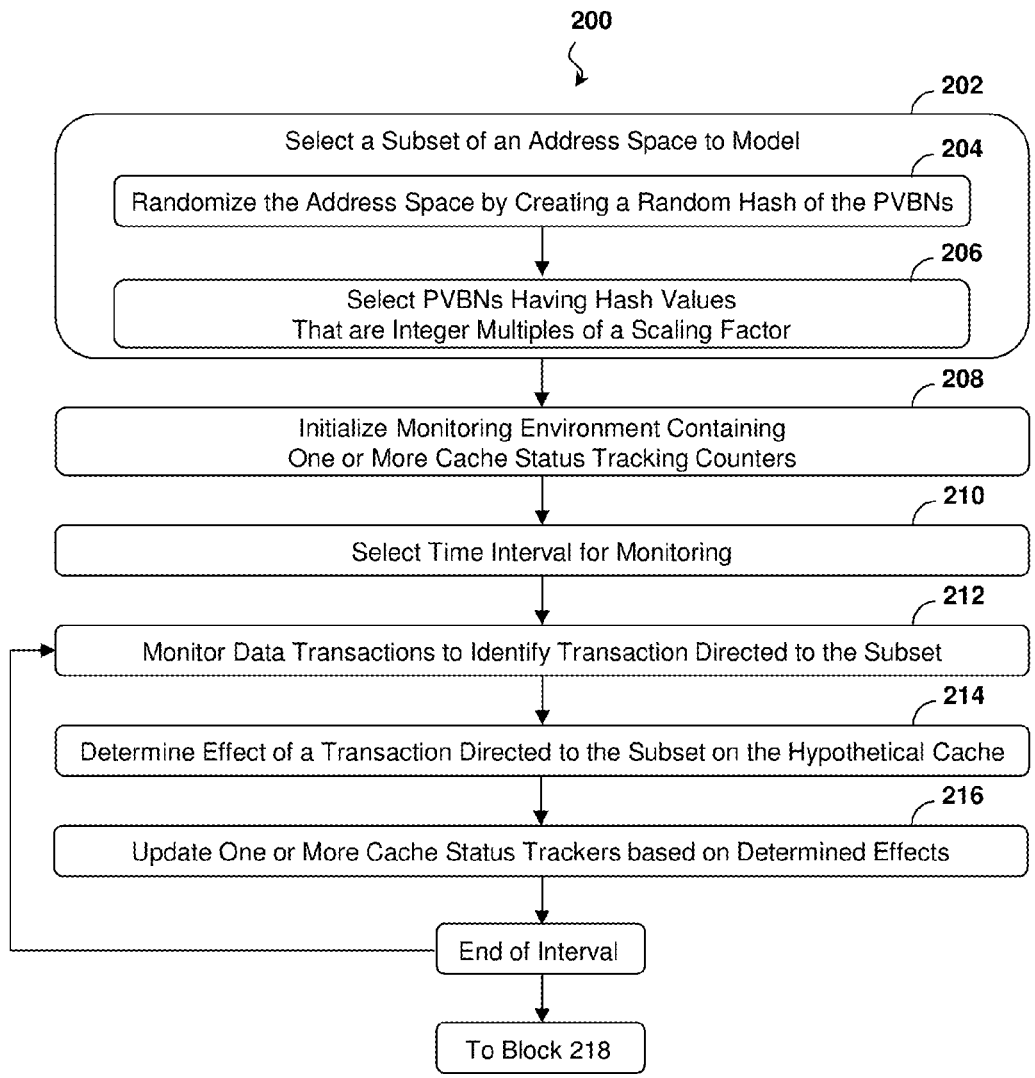
FIGS. 2A and 2B are flow diagrams of the method of modeling a hypothetical cache according to aspects of the present disclosure.
Figure 2B:
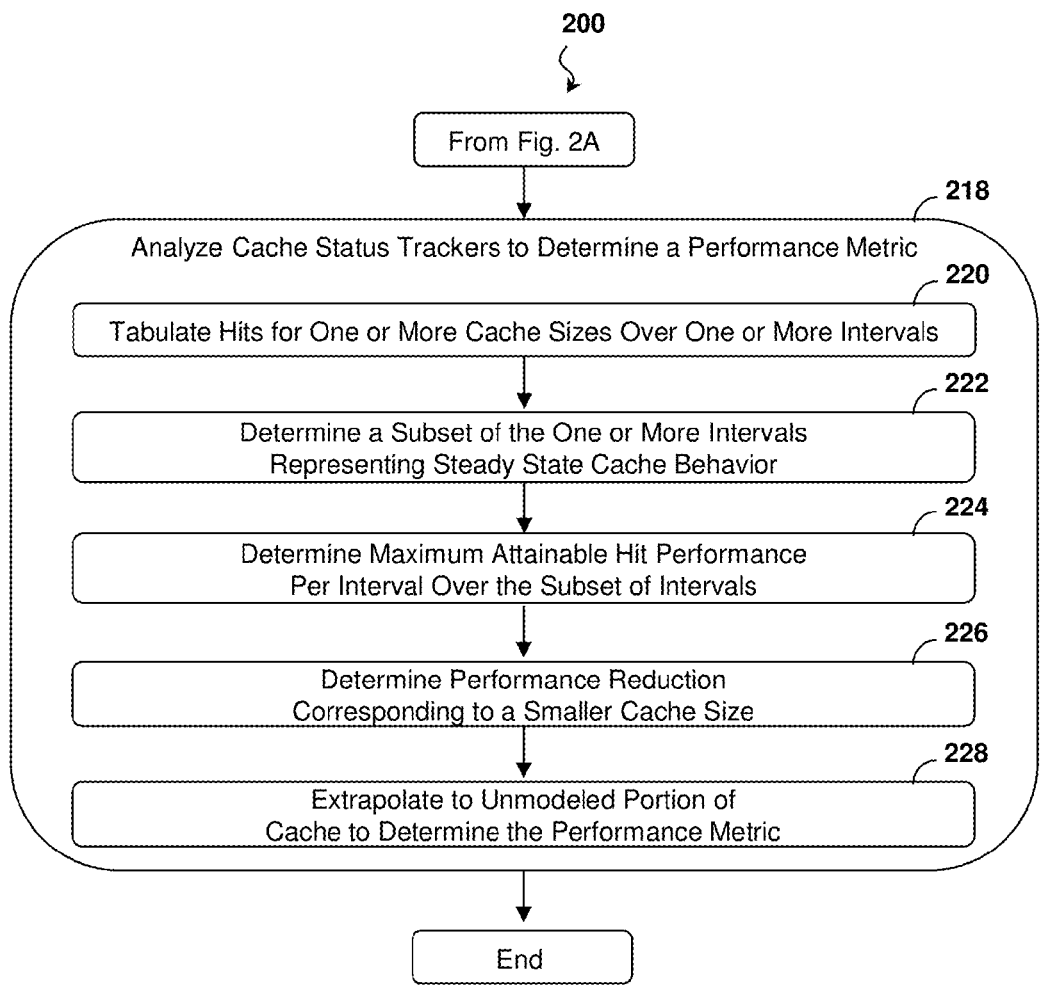
Figures 3, 4:
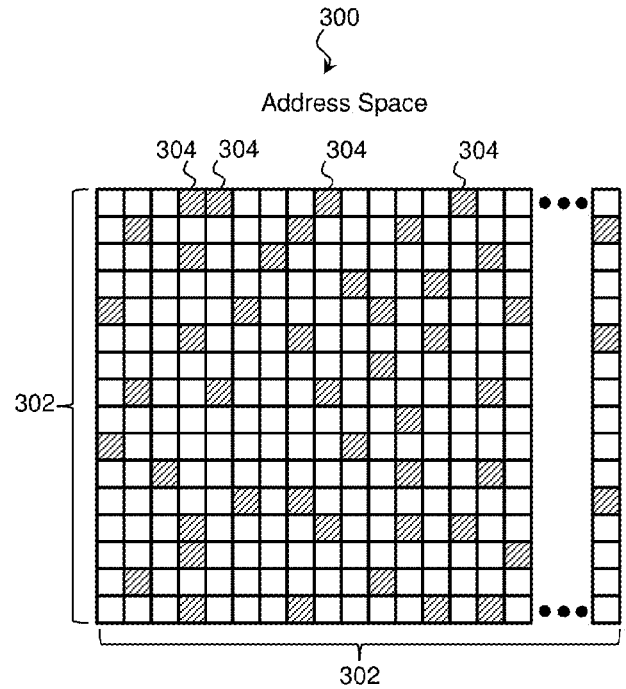
FIG. 3 is a memory diagram of an address space of a memory structure according to aspects of the present disclosure.
FIG. 4 is a diagram of a pseudo cache (pcache) according to aspects of the present disclosure.

A method of modeling cache behavior in order to determine a performance benefit associated with adding a cache of a particular size is described with reference to FIGS. 2A, 2B, and 3-9. FIGS. 2A and 2B are flow diagrams of the method 200 of modeling a hypothetical cache according to aspects of the present disclosure. It is understood that additional steps can be provided before, during, and after the steps of method 200, and that some of the steps described can be replaced or eliminated for other embodiments of the method. The method 200 is suitable for performing using a computing system such as the storage server 102 described with respect to FIG. 1. FIG. 3 is a memory diagram of an address space of a memory structure according to aspects of the present disclosure. FIG. 4 is a diagram of a pseudo cache (pcache) according to aspects of the present disclosure. FIGS. 5-8 are diagrams of a monitoring environment in various stages of the method 200 of modeling the hypothetical cache according to aspects of the present disclosure.

As described in detail below, the method 200 models system performance by analyzing the real-world workload of the computing system and determining a performance benefit of adding a cache of a particular size. Based on this determination, customers can select a cache size that balances performance and cost. The method 200 includes selecting a subset of a memory space to model and identifying data transactions directed to the subset of the memory space. The effects of these data transactions on a hypothetical cache are recorded using a number of status trackers. From these determined effects, various performance metrics related to cache size can be measured and analyzed. Based on the performance metrics, customers can select an optimal sized cache tuned specifically to the customer's application. Because of the overhead involved in tracking data transactions, in some embodiments, the subset is a substantially smaller than the actual memory space. In such embodiments, steps are taken to ensure that the subset is a representative sample of the memory space. In order to further reduce the overhead involved in tracking data transactions, in some embodiments, the tracking counters are sized to reduce their respective memory footprints. Because of the minimal burden on the computing system, the method 200 is suitable for in situ modeling cache modeling and may be performed while the computing system is in operation.

As described above, the tracking counters record the status of a hypothetical cache as if the hypothetical cache were added to the memory structure 116. In some embodiments, a reference cache size is defined as a minimum cache size capable of producing every possible hit within a workload. In other words, while not every transaction can hit in a cache regardless of size, it is possible to identify those transactions that have the potential to hit and to determine a minimum cache size capable of servicing those transactions. This size may be referred to as the reference cache size and may vary over time based on the transactions of the workload. Smaller cache sizes may be defined as a relative amount (e.g., a percentage) of the reference cache size. As described below, in some embodiments, it is possible to model the performance associated with the reference cache size and the performance associated with one or more smaller cache sizes concurrently. From this information, an informed decision can be made about the amount of cache to add to the system.

The method begins by determining how much of the memory structure 116 to model. The memory addresses (i.e., the physical volume block numbers (PVBNs)) of the memory structure 116 are represented as blocks 302 (including shaded blocks 304) in FIG. 3. Referring to block 202 of FIG. 2A and to FIG. 3, the computing system selects a portion or subset of the address space of the memory structure 116 to model. In some embodiments, the selected portion of the address space includes the entire address space of the memory structure 116. However, the overhead involved in monitoring the effects of transactions on a large address space may prove prohibitive. As an alternative, in some embodiments, accurate and reliable performance information is obtained by selecting a reduced address space and modeling only a portion of the hypothetical cache. The remainder of the hypothetical cache may be assumed to perform similar to the modeled portion. Referring to FIG. 3, an exemplary subset of PVBNs (memory addresses) selected to be modeled are represented as shaded blocks 304.

Blocks 204-206 of FIG. 2A illustrate an exemplary technique for selecting a portion of the address space of the memory structure 116 to model. Because memory addresses are often accessed sequentially, monitoring a sequential address range may give too much weight to statistical anomalies such as hot region effects. Accordingly, referring to block 204, the address space of the memory structure 116 is randomized. In an exemplary embodiment, the computing system creates and stores a pseudo random hash of the address space of the memory structure 116. The pseudo random hash includes key value pairs where each key corresponds to a unique PVBN of the memory structure 116 and the value associated with each key is a random integer.

Referring to block 206, the subset of the address space of the memory structure 116 is selected based on a sampling factor. The subset becomes the address space to be modeled. In one such embodiment, the subset contains only PVBNs that have hash values that are integer multiples of the scaling factor (in other words, PVBNs where hash(PVBN) % scaling factor=0). Transactions affecting data within these PVBNs are monitored as described below. As can be seen, the scaling factor reduces the address space being modeled but does not affect the size of the hypothetical cache. In that regard, the hypothetical cache can be said to remain same size as the storage aggregate 124. The scaling factor merely designates the amount of the hypothetical cache that will be modeled. From the usage history of the modeled portion, an optimal size for the hypothetical cache can be determined.

Referring to block 208, a monitoring environment containing one or more cache status trackers is initialized and stored in the computing system. Depending on the statistical analysis to be performed after data is collected, any number of cache status trackers may be used. One example, illustrated in FIG. 4, is a pseudo cache 400 (pcache). The pcache 400 tracks the status of blocks within the hypothetical cache, and more specifically, tracks the status of the selected subset of PVBNs to be modeled. In the illustrated embodiment, the pcache 400 includes a table containing an entry 402 for each PVBN in the subset of the address space. In some embodiments, as the pcache address space depends on the sampling factor of block 206, the number of pcache 400 entries 402 is substantially equal to the number of address in the memory structure 116 divided by the sampling factor. The pcache 400 is not limited to a table format, and in further embodiments, the pcache 400 takes other suitable forms such as an associative array, a directly-mapped table, a hierarchy of arranged memory blocks, a database, and/or a tree. The particular form may be selected based on ease of memory allocation and access efficiency.

The pcache 400 is not necessarily a true cache but is used instead to track effects of transactions on the hypothetical cache. Accordingly, in many embodiments, pcache 400 entries 402 store status values representing states of the hypothetical cache but do not store the contents of the hypothetical cache. Omitting the cache contents reduces the sizes of the entries 402 and correspondingly the pcache 400. As the pcache 400 may compete with the day-to-day data operation of the computing system for both memory and processing resources, reducing the footprint of the pcache 400 may improve system performance. In the illustrated embodiment, each entry 402 of the pcache 400 is two bytes. The first ten bits form a timestamp field 404. In order to model a least-recently used (LRU) caching scheme where older data is discarded in favor of newer data, the value in the timestamp field 404 stores the last time that the corresponding address in the hypothetical cache was accessed. In the interest of brevity, the disclosure that follows is limited to an LRU example. However, other caching schemes are both contemplated and provided for. For example, in order to model a first-in first-out (FIFO) caching scheme, the timestamp field 404 stores the cache insert time for the corresponding address in the hypothetical cache. The remainder of method 200 is substantially similar for both the LRU and the FIFO caching schemes.

In the illustrated embodiments, the remaining six bits of the pcache entry 402 are used as flag fields 406. In various such embodiments, the flags 406 indicate whether a corresponding cache block is in use or free, indicate cache type (e.g., read cache or write cache), indicate data type (e.g., user data or metadata), differentiate types of metadata, and/or indicate other data and transaction attributes. Of course, the illustrated fields and their sizes are merely exemplary. However, the field sizes determine the memory footprint of the pcache 400 and may be selected accordingly. In many embodiments, the field sizes are selected so that the pcache 400 can be stored in the system memory (e.g., RAM) of the computing system without impacting the other processing activities of the system.

Referring still to block 208, other cache status trackers may be initialized and stored in the computing system. In some exemplary embodiments, these trackers include a histogram that tracks the age (the timestamp field 404 value) of each pcache entry 402 and a cumulative histogram that tracks the number of pcache entries 402 with an age newer than or equal to a particular index. In some exemplary embodiments, the trackers include hit counters. One such hit counter records the number of read and/or write hits to PVBNs within the pcache 400 per interval. Another hit counter records the number of hits for a cache of a particular size. A final exemplary tracker records the age (timestamp field 404 value) of any pcache entry 402 associated with a cache hit.

Referring to block 210, a time interval for monitoring data transactions is selected. As transactions are grouped by time interval, the size of the time interval determines the granularity of the measurements taken of the hypothetical cache. The precision offered by smaller intervals is balanced against the processing burden of updating the subset of cache status trackers that are refreshed at the end of each time interval. In an exemplary embodiment, a time interval of ten minutes is suitable for modeling a hypothetical victim cache (a fully associative cache that stores blocks ejected from a higher-level cache) of a disk array. Using an exemplary ten-bit timestamp field 404 (1024 unique values), the pcache 400 is able to monitor cache status for over a week in ten minute increments.

Referring to block 212, the computing system monitors data transactions issued to the memory structure 116. As mentioned above, these may be data transactions generated by the computing system and/or transactions received from hosts 104 or other systems. The monitoring identifies those data transactions directed to (e.g., reading, writing, or otherwise accessing) PVBNs within the selected subset of the address space. These transactions can be said to "touch" the modeled portion of the hypothetical cache. The data transactions may be monitored directly or indirectly. That is, in block 212, the data transaction received by a memory structure 116 may be analyzed to determine the target PVBN. Additionally or in the alternative, other signals and commands within the computing system and/or the memory structure 116 may be used to determine whether a data transaction touches the modeled cache. For example, in some embodiments, the monitoring of block 212 includes monitoring accesses, flushes, and evictions of a higher-level cache to determine whether the data transaction would be serviced by the higher-level cache or the hypothetical cache.

Referring to block 214, for transactions that touch the modeled cache, the computing system determines the effect of the transaction on the hypothetical cache. In various embodiments, this includes determining whether a transaction would hit in the hypothetical cache, determining whether the transaction would modify a cache entry, determining the cache state after the transaction, and/or other suitable determinations. Referring to block 216, the pcache and any other cache status trackers are updated based on the determined effects. The cache status trackers may be updated as transactions arrive, at the end of each interval, or a combination thereof. In an exemplary embodiment, the pcache, a histogram, and a hit counter are updated as each transaction arrives, while a cumulative histogram is updated at the end of each interval. Some trackers may be reset after every interval. The monitoring and updating of blocks 212-216 may be repeated for multiple intervals.

Figure 5:
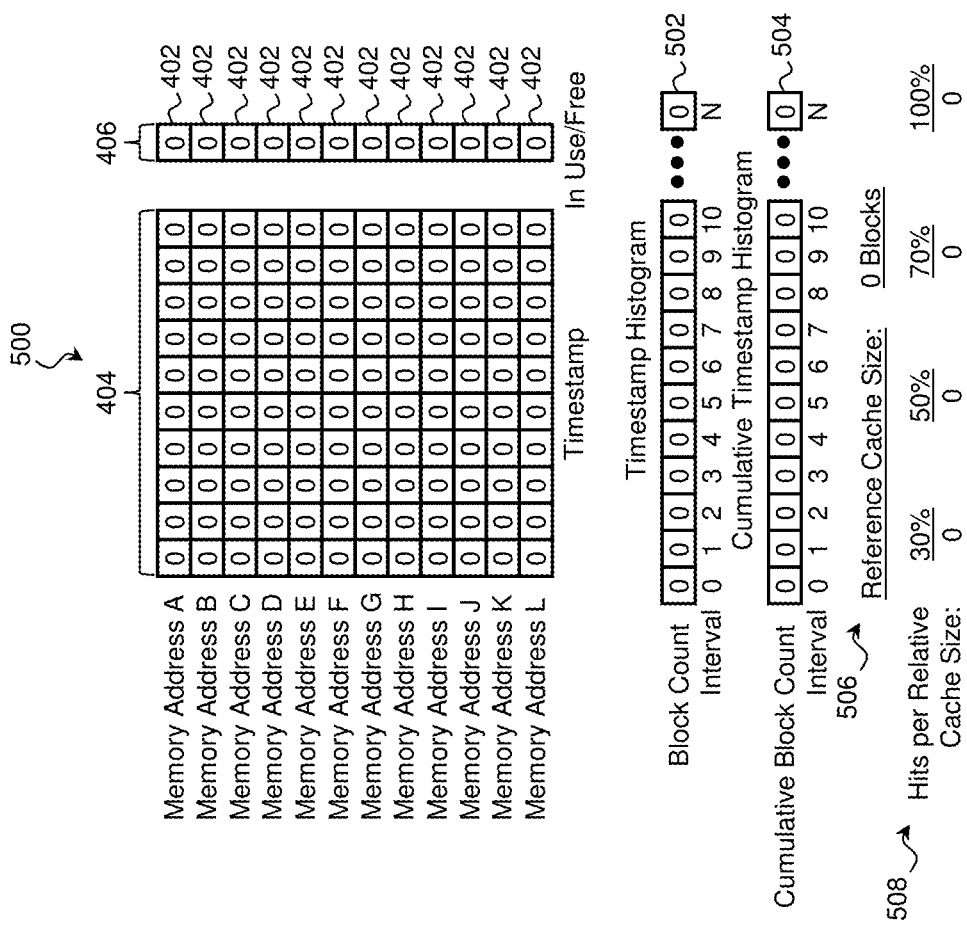
FIGS. 5-8 are diagrams of a monitoring environment in various stages of the method of modeling the hypothetical cache according to aspects of the present disclosure.

An example of the monitoring and updating of blocks 212-216 is described with reference to FIGS. 5-8. For clarity of explanation, the number of transactions and the pcache 400 size have been reduced. Referring first to FIG. 5, the computing system initializes and stores a monitoring environment 500 including a pcache 400, a timestamp histogram 502, a cumulative timestamp histogram 504, a reference cache size indicator 506, and a hit counter 508 that tracks hits for four relative cache sizes expressed as a percentage of a reference cache size (30%, 50%, 70% and 100%), where the reference cache size is defined as a minimum cache size capable of servicing every possible cache hit within a workload and also corresponds to the number of pcache entries 402 in use.

The pcache 400 tracks the status of blocks within the hypothetical cache, and each entry 402 includes a timestamp field 404 and a flag field 406 indicating whether the corresponding cache block is in use or free. As the hypothetical cache is empty upon initialization, each pcache entry 402 may be in an initialization state. In the exemplary embodiment, the initialization state has a timestamp field 404 set to "0" and a flag field 406 set to "0" indicating that the corresponding cache block is free. In a further embodiment, in the initialization state, one or more of the timestamp field 404 and a flag field 406 are undefined or unallocated.

The timestamp histogram 502 tracks the number of pcache entries 402 in use (e.g., with flag field 406 set to "1") with a particular age (timestamp field 404 value). In the initialization state, none of the blocks of the pcache entries 402 are in use, and thus the timestamp histogram 502 is zero for all intervals. The cumulative timestamp histogram 504 tracks the number of pcache entries 402 in use (e.g., with flag field 406 set to "1") with a particular age or newer. In the initialization state, the cumulative timestamp histogram 504 is zero for all intervals.

The reference cache size indicator 506 records the number of blocks of the hypothetical cache currently in use and represents the minimum cache size capable of servicing every possible cache hit. In the initialization state, the reference cache size indicator 506 is zero. The hit counter 508 tracks the total number of hits per relative cache size as will be disclosed in more detail below. In the initialization state, no transactions have hit, and the hit counter 508 is zero for all relative sizes.

Figure 6:
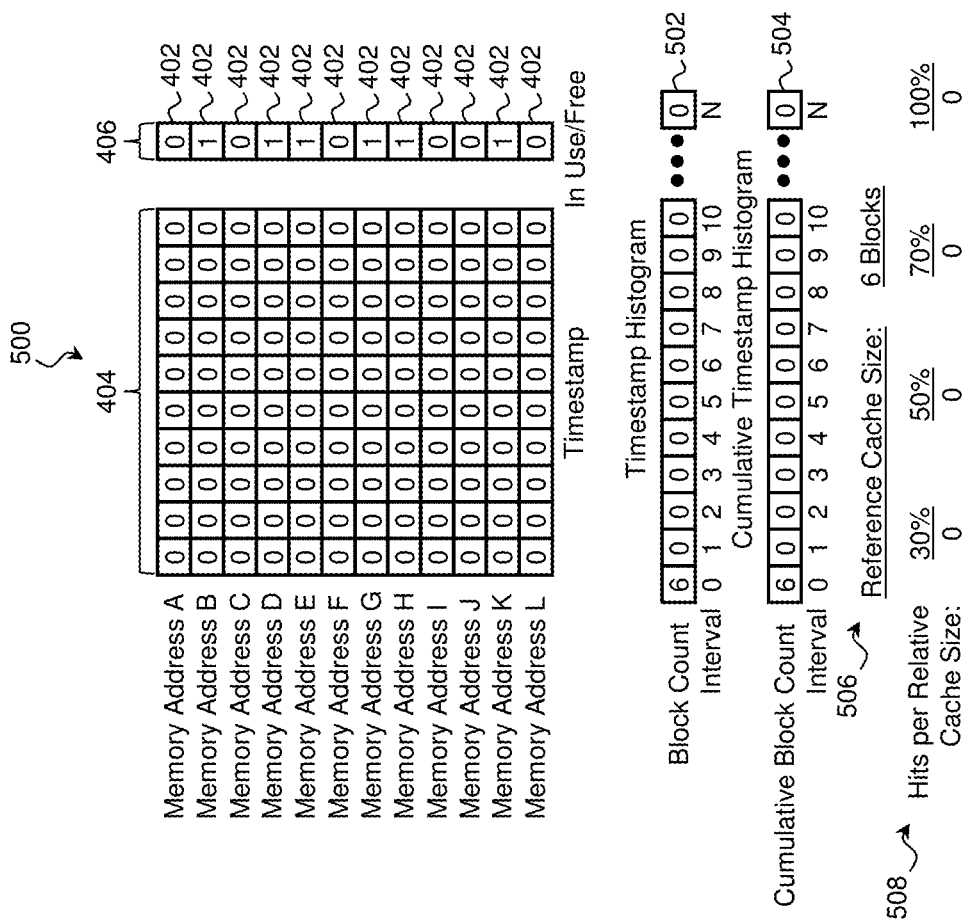

Referring to FIG. 6, during a first interval, interval 0, the computing system identifies transactions that touch the modeled portion of the cache using a technique substantially as described in block 212. In response to each of these transactions, the computing system determines the effect of each transaction on the hypothetical cache in a manner substantially as described in block 214. In the example, it is determined that six unique PVBNs of the hypothetical cache would have been accessed (memory addresses B, D, E, G, H, and K), but no transactions hit. In the exemplary embodiment, the pcache 400, the timestamp histogram 502, the reference cache size indicator 506, and the hit counter 508 are updated as each transaction is received, while the cumulative timestamp histogram 504 is only updated at the end of the interval. The hit counter 508 data is saved and the counts are reset at the end of each interval.

Accordingly, FIG. 6 illustrates the state of the pcache 400 and the other trackers following the first interval. The timestamp field 404 of the six entries 402 corresponding to the six accessed PVBNs are set to "0" to indicate that these PVBNs were most recently accessed during interval 0, and the flag 406 of the six entries 402 is set to "1" to indicate the corresponding block is in use. Pcache entries 402 for PVBNs that were not accessed remain in their previous state. The timestamp histogram 502 and cumulative timestamp histogram 504 are updated based on the timestamp fields 404 to record that six "in use" pcache entries 402 have timestamps of "0." The reference cache size indicator 506 is set to "6" representing the six pcache entries 402 in use.

Figure 7:
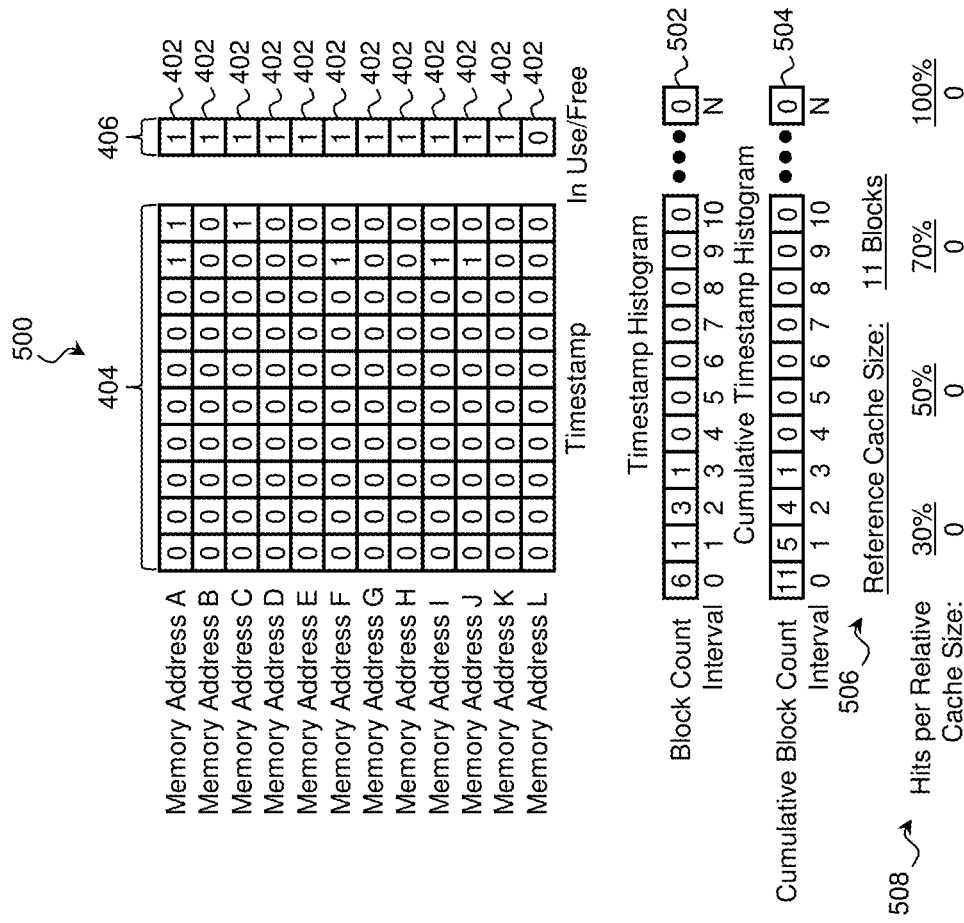

The process is repeated for a number of intervals. FIG. 7 illustrates the monitoring environment at the beginning of interval 4, when, in the example, the first hit is recorded. When a hit is detected, the timestamp of the corresponding pcache entry 402 is used to determine what size cache would be capable of servicing the hit. In the example, a transaction attempts to access memory address I, which has a last recorded access of interval 2 according to the timestamp field 404 of the associated pcache entry 402. From the cumulative timestamp histogram 504, it is determined how many cache blocks have a corresponding timestamp field 404 of interval 2 or greater. In the example of FIG. 7, 4 blocks have a timestamp field 404 of 2, 3, or greater. In a least-recently used (LRU) caching scheme, older data is discarded in favor of newer data, and thus an LRU-type cache would require at least four blocks to record the cached data of intervals 2, 3, and 4. A relative cache size is determined by dividing the number of blocks having a timestamp field 404 interval 2 or greater (i.e., 4) by the reference cache size (i.e., 11). In the example, the transaction would hit on a cache having a size approximately 36% of the reference cache size or greater. The hit counter 508 entries are incremented for each relative cache size that meets or exceeds this size and therefore would have hit. In the example, the entries for 50%, 70% and 100% would be incremented, while 30% would not.

Figure 8:
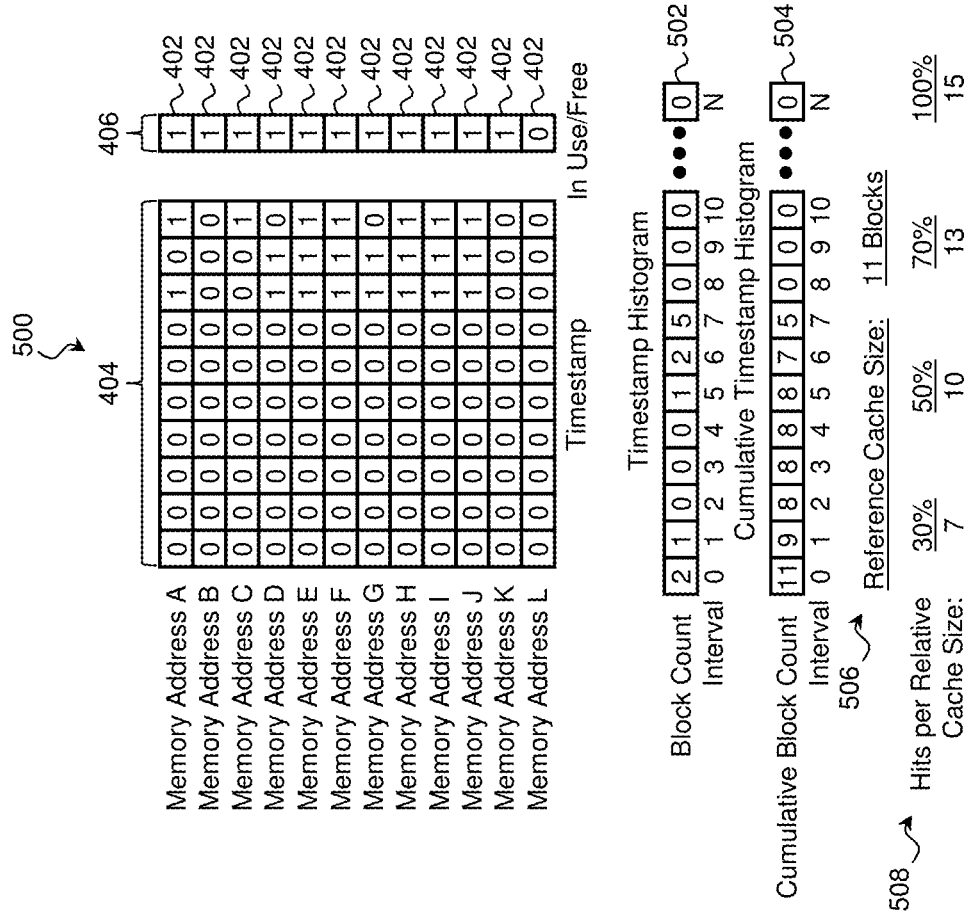

FIG. 8 illustrates the monitoring environment after interval 7. At the end of the interval, the timestamp fields 404 of the pcache 400 contain timestamps ranging from interval 0 to the latest interval, interval 7. Similarly, the timestamp histogram 502 and cumulative timestamp histogram 504 have entries for intervals 0 through 7.

Referring now to block 218 of FIG. 2B, at any time within the method 200, the pcache 400 and the other cache status trackers are analyzed by the computing system to determine a performance metric for one or more hypothetical cache sizes. From the performance metric, an optimal cache size can be determined. A number of analytical techniques are described in blocks 220-228. These techniques are exemplary and non-limiting and no technique is either characteristic of or required for any particular embodiment.

Figure 9:
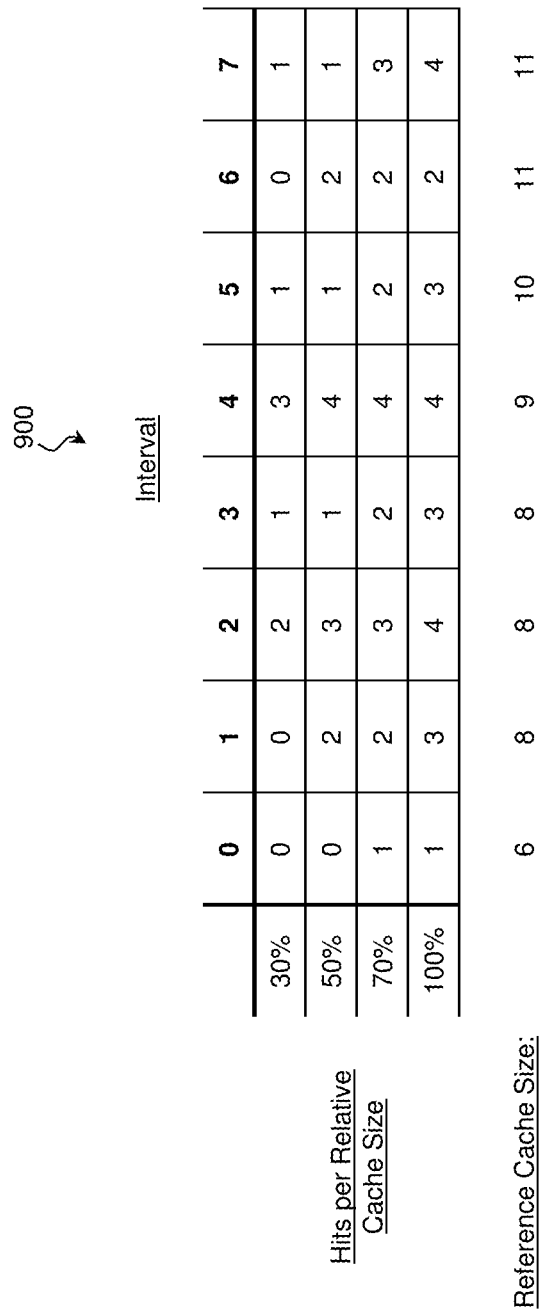
FIG. 9 is a diagram of an exemplary table expressing cache hits per interval for various cache sizes according to aspects of the present disclosure.

Referring to block 220 of FIG. 2B and to FIG. 9, a table 900 may be compiled based on a hit counter 508 and/or a reference cache size indicator 506 substantially as described in blocks 202-216 and in the context of FIGS. 5-8. FIG. 9 is a diagram of one such table 900 expressing cache hits per interval for various cache sizes according to aspects of the present disclosure. In the illustrated table 900, hits are represented by a hit count. In further embodiments, hits are represented as a hit rate percentage determined by dividing the number of hits during an interval by the total number of transactions that touch the modeled portion of the address space during the interval.

Because cache performance may vary due to changes in workload as well as "cold cache effects" (the tendency of a cache to miss excessively while the cache is being filled), a subset of the intervals that represents a steady state cache behavior may be selected from the table as shown in block 222 of FIG. 2. In an exemplary embodiment, the set of intervals is determined by selecting those intervals where a hit metric, a reference cache size, and/or other metric remains bounded within a particular range of a mean value, for example +/−10%. Intervals that exceed the boundary range may be excluded from analysis.

Referring to block 224 of FIG. 2, a hit metric corresponding to a maximum attainable number of hits or a maximum attainable hit rate for an interval is determined over the set of intervals. As disclosed above, this maximum hit metric is attainable using a cache that is approximately the same size as the reference cache size or greater. Referring to block 226 of FIG. 2, a performance variation in the hit metric associated with a cache size smaller than the reference cache size is determined. If the system performance in view of the reduction still meets or exceeds a performance target, the smaller cache size may be acceptable for the modeled workload.

As disclosed above, the method 200 may model only a portion of the total hypothetical cache. Referring to block 228 of FIG. 2B, the results determined in block 226 are extrapolated or projected for the unmodeled remainder of the hypothetical cache. In some embodiments, the remainder of the hypothetical cache is assumed to perform similarly to the modeled portion. For example, based on a determination that, for the modeled portion, the reference cache size is 80% of the modeled address space, it may be determined that the reference cache size for the remainder would be 80% of the remaining address space. As a further example, based on a determination that, for the modeled portion, a cache size of 30% of the reference cache size produces 80% of the maximum attainable hits, it may be determined that a cache having a size that is 30% of the reference cache size of the entire address space would also produce 80% of the maximum attainable hits over the entire address space. This process may be used to determine the minimum hypothetical cache size capable of meeting a performance target. It is understood that the preceding analysis is merely exemplary and other methods of determining a performance metric for one or more hypothetical cache sizes are both contemplated and provided for.

In some embodiments, once a size for the hypothetical cache is selected, a physical cache of a corresponding size is added to the computing system. This may include installing one or more storage devices including of one or more types of storage media into the computing system. For example, a user may add at least one storage device to the computing system in order to form a cache having a size approximately equal to the minimum size satisfying the performance target. In some such embodiments, the computing system adds the storage devices to an existing cache tier of the memory structure 116.

Additionally or in the alternative, the computing system may create a new cache tier and add the storage devices to the new tier.

Figure 10:
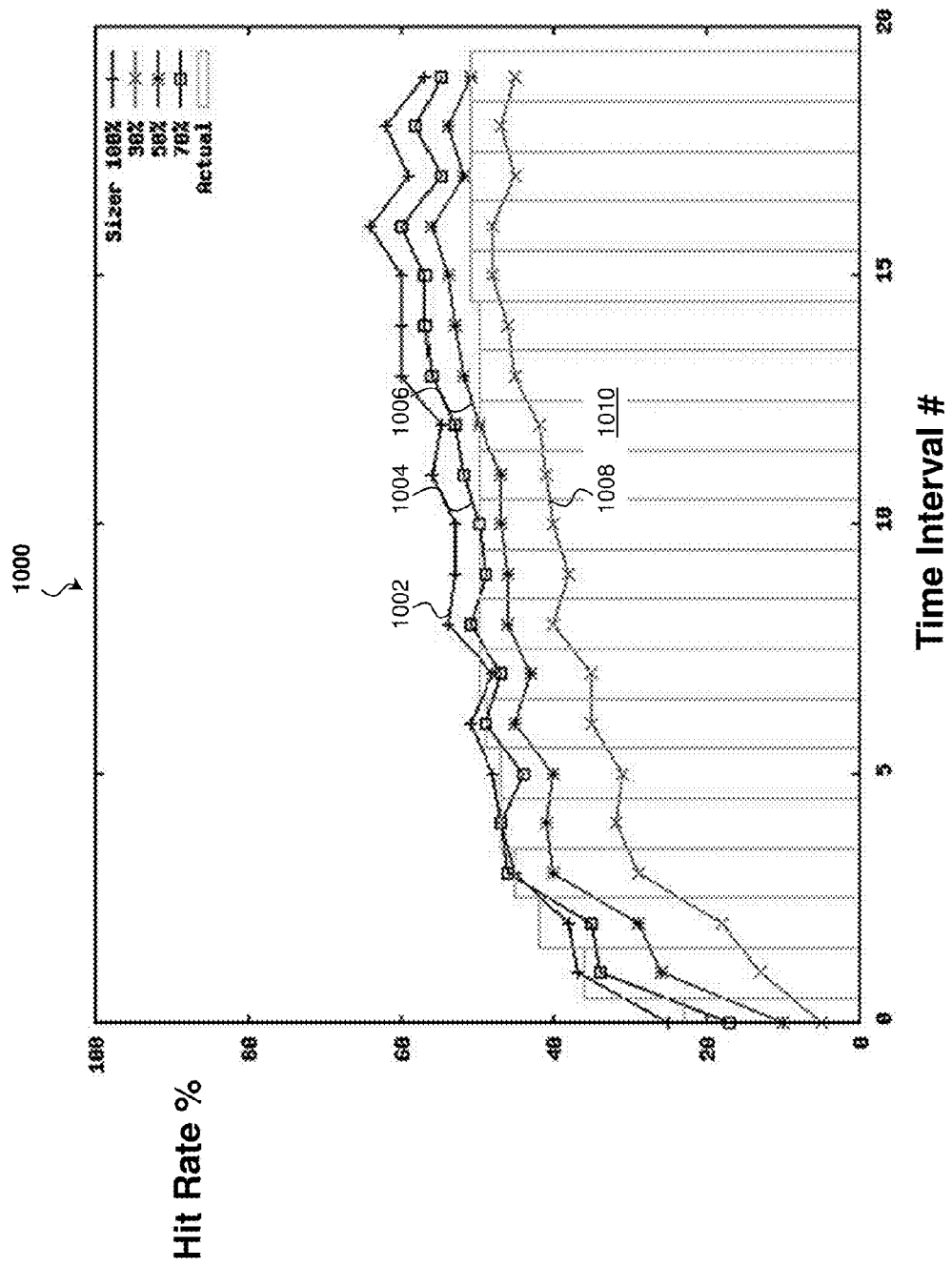
FIG. 10 is a graph of hit rates for a range of cache sizes according to aspects of the present disclosure.

Referring now to FIG. 10, illustrated is a graph 1000 of hit rates per interval for a range of cache sizes according to aspects of the present disclosure. Graph 1000 contains observed and calculated data collected substantially as described in method 200. Line 1002 represents hit rates for a hypothetical cache that is greater than or substantially equal to the reference cache size for the particular interval. In that regard, line 1002 represents a maximum attainable hit rate for the particular workload.

In contrast, lines 1004, 1006, and 1008 represent hit rates for smaller hypothetical caches. For example, line 1004 represents hit rates for a hypothetical cache that is 70% of the reference cache size. Line 1006 represents hit rates for a hypothetical cache that is 50% of the reference cache size. Line 1008 represents hit rates for a hypothetical cache that is 30% of the reference cache size. By comparing lines 1004, 1006, and 1008 to line 1002, a user can get a sense of the relative performance of each cache size.

Whereas lines 1002, 1004, 1006, and 1008 represent modeled cache hit rates, bars 1010 represent the observed hit rate of an actual cache of the computing system undergoing the same workload. Bars 1010 are included in graph 1000 to demonstrate the high degree to which the modeled cache accurately reflects the behavior of an actual cache.

The present embodiments can take the form of an entirely hardware embodiment, an entirely software embodiment, or an embodiment containing both hardware and software elements. In that regard, in some embodiments, the computing system is programmable and is programmed to execute processes including those associated with cache modeling such as the processes of method 200 of FIGS. 2A and 2B. Accordingly, it is understood that any operation of the computing according to the aspects of the present disclosure may be implemented by the computing system using corresponding instructions stored on or in a non-transitory computer readable medium accessible by the processing system. For the purposes of this description, a tangible computer-usable or computer-readable medium can be any apparatus that can store the program for use by or in connection with the instruction execution system, apparatus, or device. The medium may include non-volatile memory including magnetic storage, solid-state storage, optical storage, cache memory, and Random Access Memory (RAM).

Thus, the present disclosure provides a system and method for modeling cache performance using a real-world workload. In some embodiments, the method for determining an optimal cache size of a computing system comprises: selecting a portion of an address space of a memory structure of the computing system; monitoring a workload of data transactions to identify a transaction of the workload directed to the portion of the address space; determining an effect of the transaction on a cache of the computing system; and determining, based on the determined effect of the transaction, an optimal cache size satisfying a performance target. In one such embodiment the determining of the effect of the transaction on a cache of the computing system includes: determining whether the effect would include a cache hit for a first cache size; and determining whether the effect would include a cache hit for a second cache size different from the first cache size.

In further embodiments, the computer system includes a processor and a non-transitory storage medium for storing instructions, the processor performing the following actions: identifying data transactions within a workload, wherein the identified data transactions are directed to an address space; determining a cache behavior resulting from a data transaction of the identified data transactions, where the cache behavior corresponds to a first cache size; determining, based on the determined cache behavior, a performance metric for a second cache size of the hypothetical cache in relation to the first cache size, wherein the second cache size and the first cache size are different; and determining, based on the performance metric, an optimal cache size for the computer system, wherein the optimal cache size meets a performance target. In one such embodiment, the computer system includes a storage system, and the identified data transactions include data transactions received by the storage system from at least one host.

In yet further embodiments, the apparatus comprises: a non-transitory, tangible computer readable storage medium storing a computer program, wherein the computer program has instructions that, when executed by a computer processor, carry out: identifying an address space of a computing system; identifying a data transaction directed to the address space; determining a first cache effect caused by performing the data transaction, wherein the first cache effect corresponds to a first cache size; determining a second cache effect caused by performing the data transaction, wherein second cache effect corresponds to a second cache size, and wherein the second cache size is less than the first cache size; determining a performance variation based on the first cache effect and a second cache effect; and determining, based on the performance variation, an optimal cache size meeting a performance target.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for determining an optimal cache size of a computing system, the method comprising:
   selecting a portion of an address space of a memory structure of the computing system;
   monitoring a workload of data transactions to identify a subset of the workload containing one or more transactions directed to the portion of the address space;
   for each transaction of the one or more transactions of the subset:
   identifying an address of the transaction within the portion of the address space;
   determining a count of addresses within the portion of the address space having respective accesses times more recent than or equal to an access time associated with the identified address; and
   determining, from the count, a minimum cache size to service the transaction; and
   determining, based on the minimum cache size, an optimal cache size satisfying a performance target.

2. The method of claim 1, wherein the determining of the optimal cache size includes:
   determining whether a transaction of the one or more transactions of the subset would result in a cache hit for a first cache size; and determining whether the transaction would result in a cache hit for a second cache size different from the first cache size.

3. The method of claim 2, wherein the first cache size corresponds to a maximum attainable cache performance, and wherein the second cache size is less than the first cache size.

4. The method of claim 1, wherein the determining of the optimal cache size includes extrapolating the portion of the address space to an unmodeled portion of the address space.

5. The method of claim 1 further comprising adding at least one storage device to the computing system and thereby forming a cache having a size corresponding to the determined optimal cache size.

6. The method of claim 1, wherein the selecting of the portion of the address space includes performing a randomizing function on the address space to select the portion.

7. The method of claim 1, wherein the selecting of the portion of the address space includes:
creating a hash of the address space having randomized hash values; and
selecting an address of the address space to include in the portion based on a hash value of the address being an integer multiple of a sampling factor.

8. The method of claim 1 further comprising creating a timestamp histogram including a timestamp for each address of the portion of the address space,
wherein the timestamp corresponds to a most recent access of the respective address, and
wherein the determining of the count is based on the timestamp histogram.

9. The method of claim 8, wherein the timestamp histogram records the most recent access using time intervals of a predetermined size.

10. The method of claim 8, wherein the timestamp histogram further records the number of cache entries in use of a hypothetical cache having a same size as the portion of the address space.

11. The method of claim 8, wherein the timestamp histogram further includes a data type associated with each address of the portion of the address space.

12. A computer system comprising:
a memory containing a non-transitory machine readable medium comprising machine executable code having stored thereon instructions for performing a method of determining an optimal cache size;
a processor coupled to the memory, the processor configured to execute the machine executable code to cause the processor to:
identify data transactions within a workload, wherein the identified data transactions are directed to a subset of an address space;
for each transaction of the identified data transactions:
determine, from an address of the transaction and a timestamp recording a time of a most recent access of the address, a count of addresses within the subset having a most recent access that is more recent than or equal to the most recent access of the address of the transaction;
determine, based on the count, whether a cache of a first cache size would service the transaction; and
determine, based on the count, whether a cache of a second cache size would service the transaction, wherein the second cache size and the first cache size are different; and
determine, based on at least one of the first cache size and the second cache size an optimal cache size for the computer system, wherein the optimal cache size meets a performance target.

13. The computer system of claim 12, wherein the computer system includes a storage system, and wherein the identified data transactions include data transactions received by the storage system from at least one host.

14. The computer system of claim 12, wherein the performance metric is based on a cache hit ratio corresponding to the first cache size and a cache hit ratio corresponding to the second cache size.

15. The computer system of claim 12, wherein the optimal cache size is a minimum cache size meeting the performance target.

16. The computer system of claim 12, wherein the subset of the address space is a randomized subset of the address space of the computer system.

17. The computer system of claim 16, wherein the machine executable code to cause the processor to determine the optimal cache size includes further machine executable code to cause the processor to extrapolate the determined cache behavior from the randomized subset of the address space to a remainder of the address space.

18. A non-transitory, tangible computer readable storage medium having stored thereon instructions for performing a method comprising machine executable code, which when executed by at least one machine, causes the machine to carry out:
identifying a subset of an address space of a computing system;
identifying a data transaction directed to the subset of the address space;
determining, based on an address of the data transaction and a timestamp recording a most recent access of the address, a total of addresses within the subset having a most recent access that is more recent than or equal to the most recent access of the address of the data transaction;
determining, based on the total, whether the transaction would produce a cache hit given a first cache size;
determining, based on the total, whether the transaction would produce a cache hit given a second cache size, wherein the second cache size is less than the first cache size; and
determining, based on at least one of the first cache size and the second cache size, an optimal cache size meeting a performance target.

19. The non-transitory, tangible computer readable storage medium of claim 18, wherein the machine executable code that causes the machine to carry out the identifying of the subset of the address space includes further machine executable code that causes the machine to carry out selecting the subset as a pseudo-random subset of the address space of the computing system.

20. The non-transitory, tangible computer readable storage medium of claim 19, wherein the machine executable code that causes the machine to carry out the determining of the performance metric includes further machine executable code that causes the machine to carry out projecting a cache effect observed in the subset of the address space of the computing system to a remainder of the address space of the computing system.

* * * * *